(12) United States Patent
Chen et al.

(10) Patent No.: US 11,325,146 B2
(45) Date of Patent: May 10, 2022

(54) MULTIPLE-NOZZLE DEFINED EDGE TOOL

(71) Applicant: NIKE, Inc., Beaverton, OR (US)

(72) Inventors: Che-Sheng Chen, Yunlin County (TW); Chien-Liang Yeh, Changhua (TW)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/983,510

(22) Filed: Aug. 3, 2020

(65) Prior Publication Data

US 2020/0360953 A1    Nov. 19, 2020

Related U.S. Application Data

(62) Division of application No. 15/824,415, filed on Nov. 28, 2017, now abandoned.

(Continued)

(51) Int. Cl.
| | |
|---|---|
| *B05D 5/10* | (2006.01) |
| *B05B 13/04* | (2006.01) |
| *B05B 12/14* | (2006.01) |
| *B05B 7/08* | (2006.01) |
| *A43D 25/18* | (2006.01) |

(Continued)

(52) U.S. Cl.
CPC ........ *B05B 13/0457* (2013.01); *A43D 25/183* (2013.01); *B05B 7/0846* (2013.01); *B05B 9/035* (2013.01); *B05B 12/122* (2013.01); *B05B 12/1472* (2013.01); *B05B 13/0221* (2013.01); *B05C 5/0204* (2013.01); *B05D 1/02* (2013.01); *B05D 5/10* (2013.01); *C09J 5/00* (2013.01); *B05B 1/14* (2013.01)

(58) Field of Classification Search
None
See application file for complete search history.

(56) References Cited

U.S. PATENT DOCUMENTS

| | | | |
|---|---|---|---|
| 2,368,829 | A | 2/1945 | Harrington |
| 2,683,626 | A | 7/1954 | Wahlin |

(Continued)

FOREIGN PATENT DOCUMENTS

| | | |
|---|---|---|
| CN | 1976755 A | 6/2007 |
| EP | 0992291 A2 | 4/2000 |

(Continued)

OTHER PUBLICATIONS

Result of Consultation received for European Patent Application No. 17817525.3, dated Apr. 20, 2021, 11 pages.

(Continued)

*Primary Examiner* — Charles Capozzi
(74) *Attorney, Agent, or Firm* — Shook, Hardy & Bacon LLP

(57) ABSTRACT

Systems apply a material (e.g., adhesive) to an article (e.g., a component in an article of footwear) with a multiple-nozzle tool. A first nozzle of the multiple-nozzle tool is effective to provide an edge application of the material that is consistent in application of the material. A second nozzle of the multiple-nozzle tool is effective to provide a greater material coverage application than the first nozzle. The second nozzle may be implemented to apply the material at an interior area from the edge at which the first nozzle applies the material, in an exemplary aspect.

4 Claims, 9 Drawing Sheets

Related U.S. Application Data

(60) Provisional application No. 62/427,695, filed on Nov. 29, 2016.

(51) Int. Cl.
  B05B 9/03 (2006.01)
  B05B 12/12 (2006.01)
  B05B 13/02 (2006.01)
  B05C 5/02 (2006.01)
  B05D 1/02 (2006.01)
  C09J 5/00 (2006.01)
  B05B 1/14 (2006.01)

(56) References Cited

U.S. PATENT DOCUMENTS

| | | | | |
|---|---|---|---|---|
| 3,003,459 | A * | 10/1961 | Sprague, Jr. | A43D 25/183 118/710 |
| 3,278,960 | A * | 10/1966 | Nardone | A43D 25/183 12/142 F |
| 3,362,643 | A | 1/1968 | Larson et al. | |
| 3,628,500 | A * | 12/1971 | Matlock | A43D 25/183 118/685 |
| 3,885,066 | A | 5/1975 | Schwenninger | |
| 4,156,398 | A | 5/1979 | Mcdaniel | |
| 4,578,290 | A | 3/1986 | Komon et al. | |
| 4,986,210 | A * | 1/1991 | Hollstein | B05B 5/032 118/629 |
| 5,090,361 | A | 2/1992 | Ishibashi et al. | |
| 5,203,792 | A * | 4/1993 | Kaiser | A43B 9/00 12/142 C |
| 5,261,958 | A * | 11/1993 | Davies | A43D 119/00 118/696 |
| 5,360,645 | A | 11/1994 | Devries | |
| 5,807,449 | A * | 9/1998 | Hooker | A43D 119/00 156/64 |
| 6,572,033 | B1 | 6/2003 | Pullagura et al. | |
| 6,589,343 | B1 * | 7/2003 | Egeland | E21B 17/006 118/315 |
| 2005/0196543 | A1 | 9/2005 | Morton | |
| 2006/0103691 | A1 | 5/2006 | Dietl et al. | |
| 2006/0280865 | A1 | 12/2006 | Tateishi | |
| 2018/0147590 | A1 | 5/2018 | Chen et al. | |
| 2018/0304293 | A1 | 10/2018 | Orla-jensen et al. | |

FOREIGN PATENT DOCUMENTS

| | | |
|---|---|---|
| JP | 2009072648 A | 4/2009 |
| KR | 10-2007-0017124 A | 2/2007 |
| KR | 10-2016-0086568 A | 7/2016 |
| WO | 2004/085082 A1 | 10/2004 |
| WO | 2015/175086 A1 | 11/2015 |

OTHER PUBLICATIONS

Intention to Grant received for European Patent Application No. 17817525.3, dated Jun. 8, 2021, 4 pages.

Extended European Search Report received for European Patent Application No. 21178417.8, dated Sep. 20, 2021, 7 pages.

Intention to Grant received for European Patent Application No. 17817525.3, dated Oct. 21, 2021, 8 pages.

* cited by examiner

MULTIPLE-NOZZLE DEFINED EDGE TOOL

CROSS-REFERENCE TO RELATED APPLICATIONS

This is a divisional application of U.S. application Ser. No. 15/824,415, entitled "Multiple-Nozzle Defined Edge Tool," and filed Nov. 28, 2017, which claims the benefit of U.S. Provisional Application No. 62/427,695, entitled "Multiple-Nozzle Defined Edge Tool," and filed Nov. 29, 2016. The entirety of each of the aforementioned applications is incorporated by reference herein.

TECHNICAL FIELD

Aspects provide methods and systems for applying material to an article with a multiple-nozzle tool.

BACKGROUND

Applying materials, such as adhesive, may be performed with a spraying tool having a nozzle. When the material is applied unintentionally outside of an application area, the article to which the material is applied may fail quality control tests because of the excessive material application. Further, if the material is not applied sufficiently to a border of the application area, the article to which the material is applied may also fail quality control tests for an insufficient amount of applied material within the material area.

BRIEF SUMMARY

Aspects hereof provide systems and methods for applying a material (e.g., adhesive) to an article (e.g., a component in an article of footwear) with a multiple-nozzle tool. A first nozzle of the multiple-nozzle tool is effective to provide an edge application of the material that is consistent in application of the material. A second nozzle of the multiple-nozzle tool is effective to provide a greater material coverage application than the first nozzle. The second nozzle may be implemented to apply the material at an interior area from the edge at which the first nozzle applies the material, in an exemplary aspect.

DESCRIPTION OF THE DRAWINGS

The present invention is described in detail herein with reference to the attached drawing figures, wherein.

DETAILED DESCRIPTION

Figure 1:
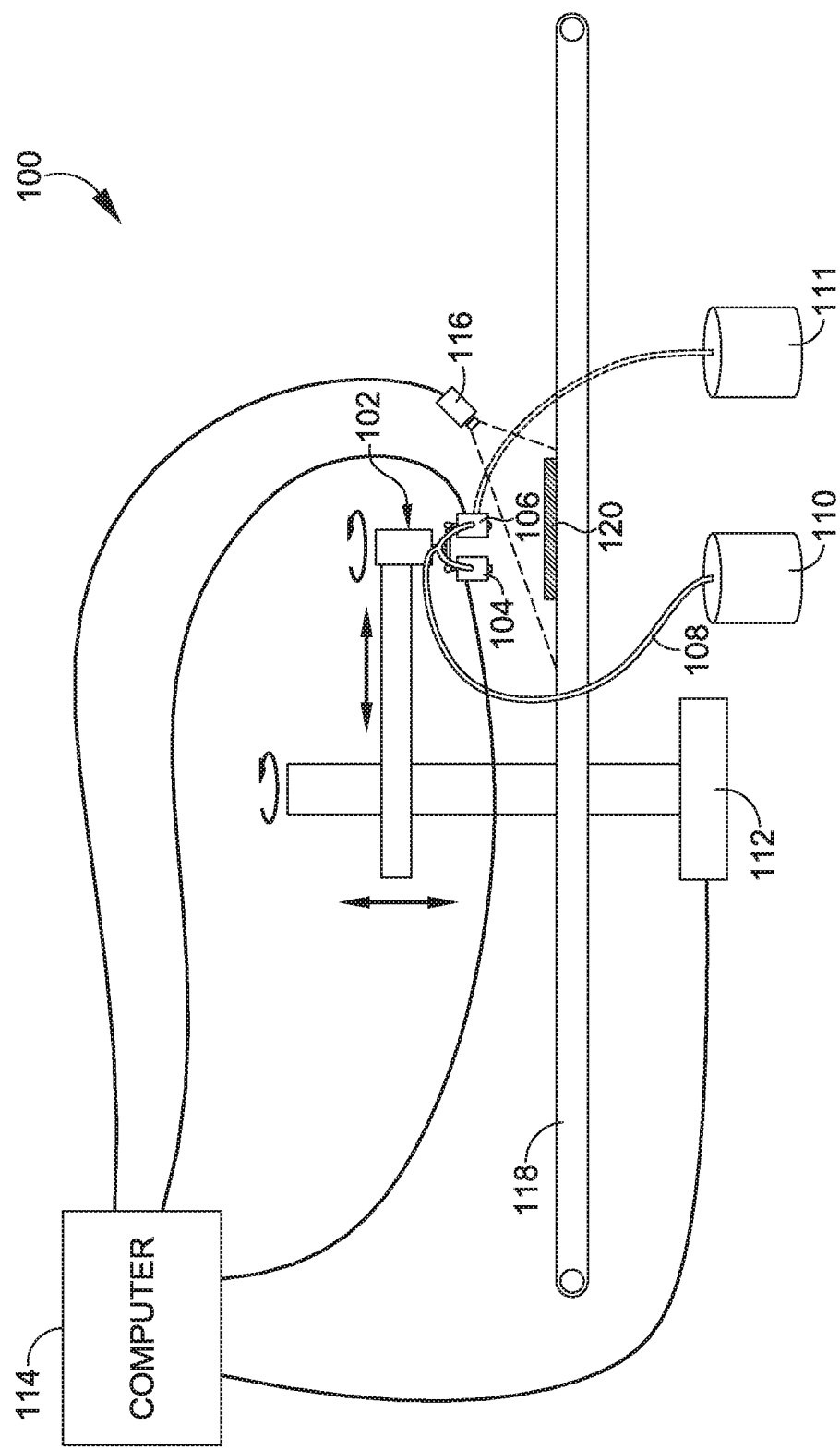
FIG. 1 depicts an exemplary multiple-nozzle tool system, in accordance with aspects hereof.

Aspects hereof provide systems and methods for applying a material (e.g., adhesive) to an article (e.g., a component in an article of footwear) with a multiple-nozzle tool. A first nozzle of the multiple-nozzle tool is effective to provide an edge application of the material that is consistent in application of the material. A second nozzle of the multiple-nozzle tool is effective to provide a greater material coverage application than the first nozzle. The second nozzle may be implemented to apply the material at an interior area from the edge at which the first nozzle applies the material, in an exemplary aspect.

In a first aspect, a multiple-nozzle tool includes a first nozzle having a first application pattern and a second nozzle having a second application pattern. The first application pattern has a smaller coverage area than the second application pattern. And the first nozzle and the second nozzle are positioned such that the first application pattern and the second application pattern partially overlap. Additional aspects contemplate that the first application pattern provides a more consistent edge than the second application pattern, which is effective to provide a consistent edge application by the first nozzle. Additional aspects contemplate that the first nozzle is positioned to effectively apply the material, such as adhesive, to an application edge of an article while the second nozzle is positioned to apply the material to an interior portion of the application area relative to the edge.

In an additional aspect, a method of applying material with a multiple-nozzle tool is contemplated. The method comprises applying a material from a first nozzle of the multiple-nozzle tool to an article and contemporaneously applying the material from a second nozzle of the multiple-nozzle tool to the article. In this example, the first nozzle applies the material at an application perimeter edge and the second nozzle applies the material more interior on the article from the application perimeter edge. Additional aspects contemplate the material applied from the first nozzle overlapping with material applied from the second nozzle as the material is contemporaneously applied by the first nozzle and the second nozzle. Additional aspects contemplate the multiple-nozzle tool traversing the article onto which the material is applied by a movement mechanism, such as a robot, such that the first nozzle applies material to an application perimeter while the second nozzle applies material to an interior area of the application area. In this example, the first nozzle has a higher consistency at an edge of material application that is aligned with the application perimeter edge than the second nozzle.

Additional systems, configurations, and methods will be provided herein to further develop and expand an understanding of a multiple-nozzle tool. While certain components, elements, and configurations are discussed, it is contemplated that additional alternatives are within the scope of the present disclosure. For example, while two nozzles will be discussed in connection with the multiple-nozzle tool, it is contemplated that three or more nozzles may be implemented in aspects. Similarly, illustrative schematic components are depicted in the figures. The components may have alternative structures and elements to accomplish the functions as described, in exemplary aspects.

FIG. 1 depicts an exemplary multiple-nozzle tool system 100, in accordance with aspects hereof. The system 100 is comprised of a multiple-nozzle tool (hereinafter "tool") 102 having both a first nozzle 104 and a second nozzle 106. The system 100 is further comprised of one or more material reservoirs 110, 111 that are fluidly coupled by a line 108 to the tool 102. The system 100 is further comprised of a movement mechanism 112, a computing device 114, a vision system 116, and a conveyance mechanism 118 in an exemplary aspect depicted.

The movement mechanism 112 may be any movement device, such as a multiaxial robot functional to move in one or more directions and/or rotate about one or more axes. For example, it is contemplated that the movement mechanism 112, as depicted, is able to position the tool 102 at various positions within three-dimensional space at various angles and rotational approaches. Alternatively, the movement mechanism 112 may operate in the X-Y plane exclusively, in a contemplated aspect.

The computing device 114 may be comprised of a processor and memory, such as computer-readable media having instructions stored thereon that, when performed, cause one or more components (e.g., movement mechanism 112, tool 102, and vision system 116) to perform one or more operations. For example, a logical coupling (e.g., wired, wireless) allows for a communication between the computing device and one or more components for both receiving and communicating information and/or instructions. The computing device may be effective for the identification of one or more articles, such as a component used in an article of footwear (shoe, boot, sandal), from information captured by the vision system 116. Similarly, the computing device 114 may be effective to identify a location of an article 120 as conveyed on the conveyance mechanism 118. Furthermore, the computing device 114 may be effective to coordinate the application of material (e.g., adhesive, paint, dye, coatings) to the article 120 by the tool 102. This coordination may include instructing the movement mechanism 112 to position the first nozzle 104 and the second nozzle 106 relative to the article 120. The coordination may also include causing the tool to selectively and adjustably apply or dispense the material to the article. This application may be controlled, in part, by one or more programs detailing tool paths and application details for a particular article. Stated differently, the computing device 114 may have stored instructions that are used to control the application of material by the tool 102 onto the article 120 by coordinating actions by one or more of the movement mechanism 112, the conveyance mechanism 118, the tool 102, and/or other components not specifically listed.

The vision system 116 may be one or more image capturing devices, such as a camera. The vision system may operate in the visible wavelength spectrum, the infrared wavelength spectrum, the ultraviolet wavelength spectrum, or other mechanisms (e.g., sonar). The vision system is effective, when implemented in an exemplary aspect, to capture one or more of the article 120, the tool 102, and/or the movement mechanism 112 in an effort to facilitate the application of material onto the article 120.

In an exemplary aspect, the vision system 116 may capture an image of the article 120. The captured image is communicated to the computing device 114 that interprets the image to identify the position, orientation, and article type. This information assists in generating an appropriate application of material and tool path for said application, in an exemplary aspect.

The material reservoir 110 (and optionally 111) provides the material to be applied by the tool 102. For example, the reservoirs 110, 111 may hold one or more adhesives. The reservoirs 110, 111 may be ambient pressure or pressurized to facilitate the transfer of material through the fluid coupling with the tool 102. It is contemplated that one or more pumps, gravity feed, pressure differentials, and the like may be implemented to transfer material from the reservoirs 110, 111 to the tool 102. Each nozzle of the tool 102 may be fluidly coupled to the same reservoir or to discrete reservoirs. For example, if a first type of adhesive (e.g., a high viscosity) may be supplied to the first nozzle 104 to provide a consistent edge application while a second type of adhesive (e.g., a low viscosity) may be supplied to the second nozzle to provide greater application coverage. As such, multiple reservoirs may be used in connection with the tool 102. Alternatively, a common material may be supplied to all nozzles (or selected nozzles) of the tool 102 from a common reservoir. In this example, if a difference in application is attempted by the various nozzles of the tool 102, the nozzles themselves may be adapted to achieve differences in application of the common material (e.g., flow rate, pressure, application pattern, volume, and the like may be adjusted to achieve the varied application).

The conveyance mechanism 118 may be any material-movement device. For example, it is contemplated that the conveyance mechanism may be a multiaxis robot, a conveyor belt, a slide table, or any dynamic or static element effective to support and optionally move the article 120 for application of material by the tool 102. In an exemplary aspect, the conveyance mechanism 118 is a conveyor having a known conveyance speed. The computing device 114 coordinates the movement of the tool 102 by the movement mechanism 112, such that the application of material by the tool 102 occurs while the article 120 is conveyed by the conveyance mechanism 118, in an exemplary aspect.

As can be appreciated, the items, elements, components, and/or devices depicted in FIG. 1 are exemplary in nature and are not limiting. Further, the relative positioning, size, and numbers are also not intended to be limiting, but instead exemplary in nature.

Figure 2:
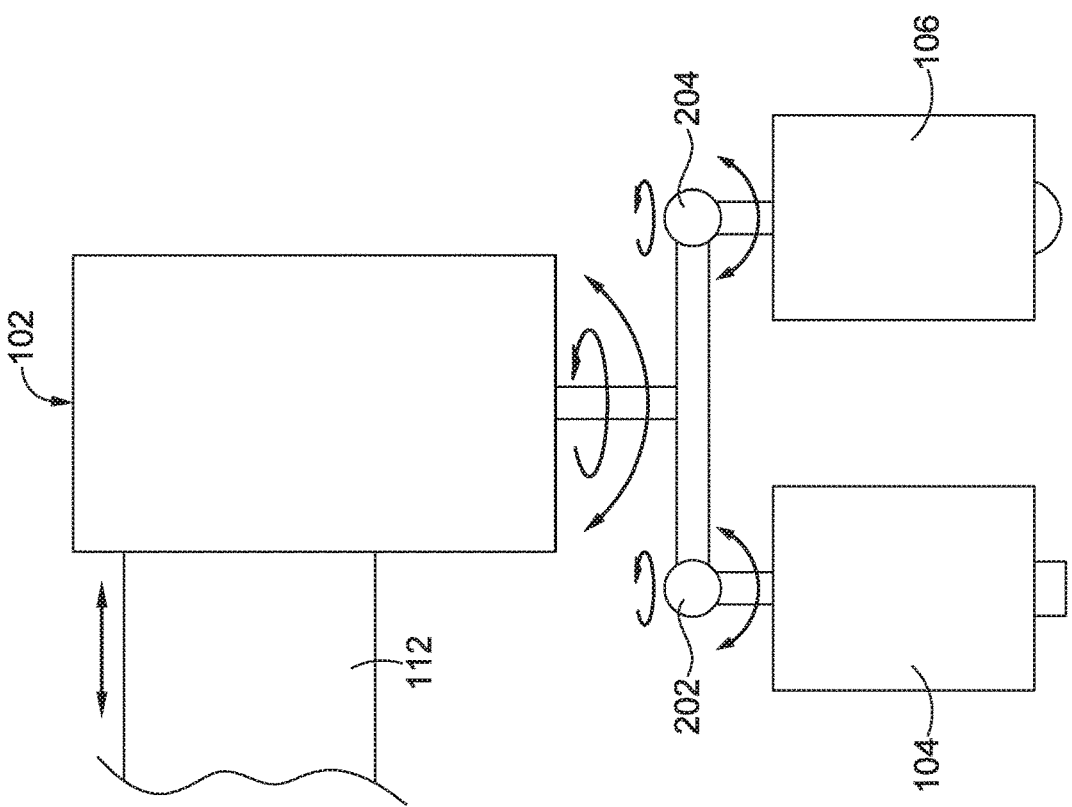
FIG. 2 depicts a zoomed view of the schematically depicted tool from FIG. 1, in accordance with aspects hereof.

FIG. 2 depicts a zoomed view of the schematically depicted tool 102 from FIG. 1, in accordance with aspects hereof. As depicted, the first nozzle 104 and the second nozzle 106 are physically coupled while independently moveable. For example, the movement mechanism 112 may position the first nozzle 104 and the second nozzle 106 at various macro positions concurrently, but each of the nozzles may further move independently from one another based on rotations at respective coupling points, as depicted by arrows of motion at couplings of the individual nozzles to the greater tool 102.

The first nozzle 104 is depicted as having a coupling joint 202 allowing for rotational movement about both a Y and a Z-axis. Similarly, a coupling joint 204 associated with the second nozzle 106 allows for a variety of degrees of motion. This additional movement may allow one of the nozzles (e.g., the first nozzle 104) to apply material to a surface off of horizontal (e.g., a side wall surface of a sole unit) while an additional nozzle (e.g., second nozzle 106) applies material to a more horizontal surface (e.g., footbed portion of the sole unit). Therefore, while used in concert, the tool 102 may adjust an application angle between the plurality of nozzles to effective apply material to an article.

Figure 3:
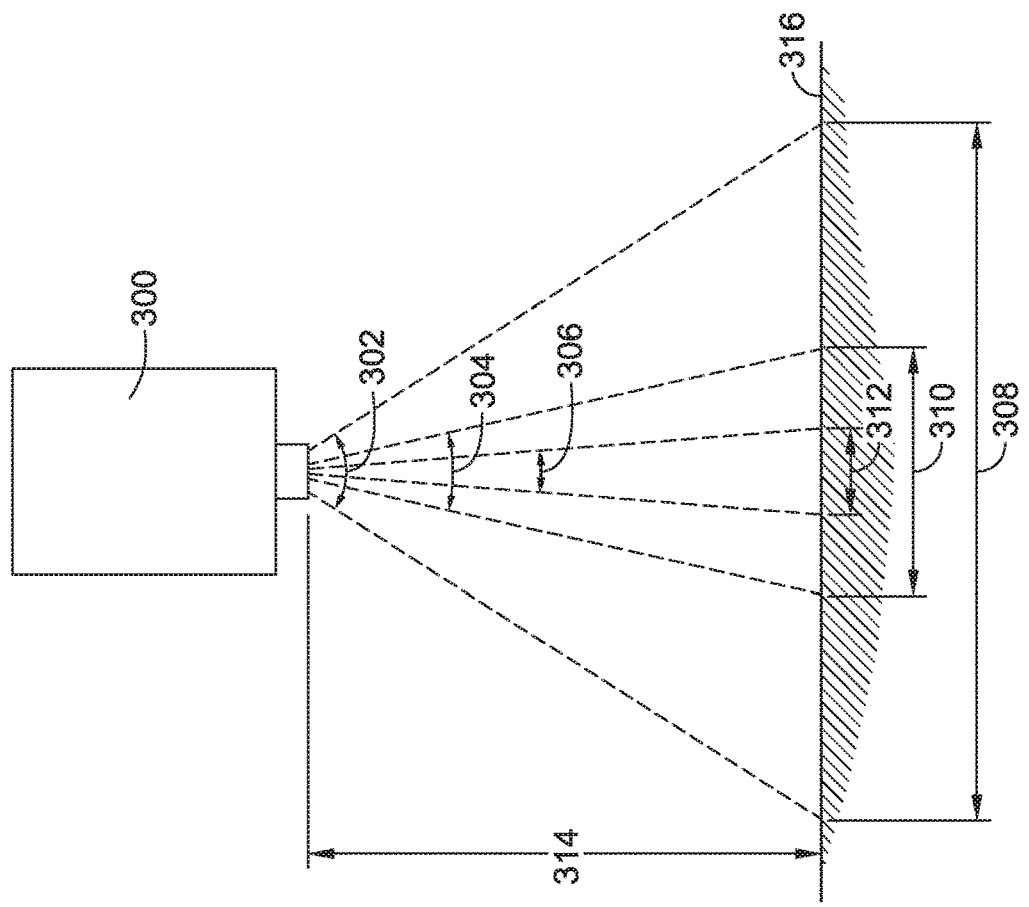
FIG. 3 depicts a nozzle having varied application patterns, in accordance with aspects hereof.

FIG. 3 depicts a nozzle 300 having varied application patterns, in accordance with aspects hereof. The nozzle 300 is representative of a nozzle that may be included in the tool 102 of FIG. 1, in an exemplary aspect. The nozzle 300 may dynamically or statically adjust the application pattern to vary a distribution area of application. For example, an article surface 316 that is a distance 314 from the nozzle 300 is depicted. Based on the distance 314, a varied coverage is achieved on the article surface 316. For example, a coverage 312 is achieved with an angle 306, a coverage of 310 is achieved with an angle 304, and a coverage 308 is achieved with an angle 302. The various angles are depicted in a two-dimensional manner, but it is contemplated that the resulting application pattern may take on any footprint, such as a linear fan, a conical structure, or a rectilinear structure, when viewed from the nozzle toward the article surface 316, in an exemplary aspect. As such, it is contemplated that the application pattern of a nozzle may be adjusted prior to applying a material or may be adjusted while the material is applied to the article. The adjustment of the application pattern during application of the material allows for a varied application of material as a continuous operation and as a result allows for a shorter cycle time with less waste of material, in an exemplary aspect.

The application patterns and angles depicted in FIG. 3 are exemplary in nature and are not limiting as to scope. Instead, they are demonstrative as to potential applications of a nozzle for a varied application pattern. It is also contemplated that an output port of the nozzle may be replaced to achieve a desired application pattern. Further, it is contemplated that a computing device (e.g., computing device 114 of FIG. 1) may control the application pattern by a nozzle. The computing device may have one or more predetermined application patterns based on tool paths to achieve an effective coverage of material application while limiting over application, in an exemplary aspect.

Figure 4:
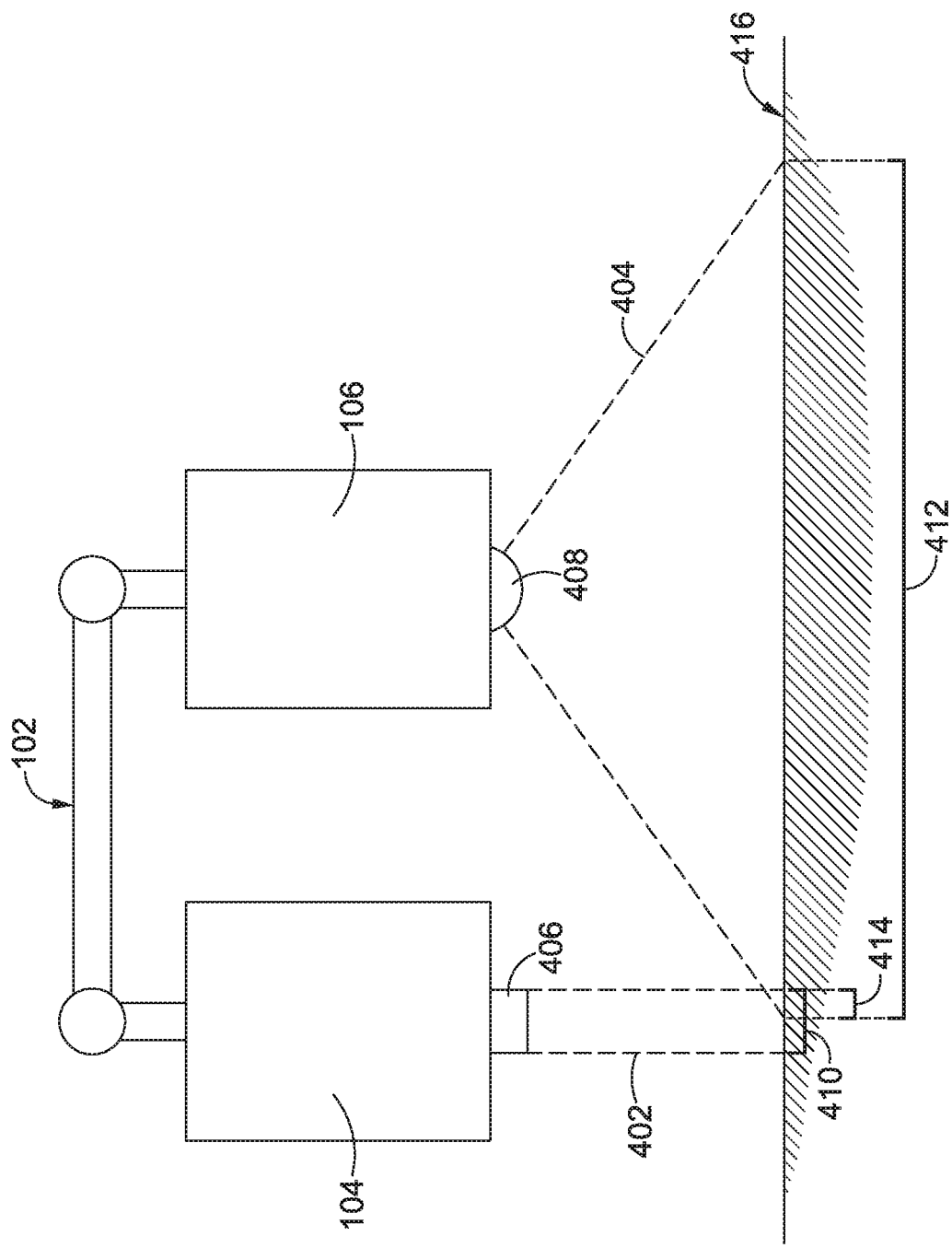
FIG. 4 depicts an exemplary application pattern from the tool of FIG. 1, in accordance with aspects hereof.

FIG. 4 depicts exemplary application patterns from the tool 102, in accordance with aspects hereof. The first nozzle 104 has an output port 406 and the second nozzle 106 has an output port 408. Material, such as an adhesive, paint, colorant, primer, durable water repellant, and other surface treatments, is expelled from the output port toward an article surface 416. As previously discussed, the material may be expelled under pressure by a pump motor, pressurized gas, gravity, and the like. In an exemplary aspect, the material is an adhesive that is sprayed from the nozzles either by pressurized gas or a pump. The application pattern of the material as it contacts the article surface 416 is determined by the respective nozzles and potentially other controlled variables (e.g., material volume, pressure, distance, material characteristics).

As presented previously, the production of an article of footwear relies, in part, on materials being applied to articles/components. For example, a sole (e.g., midsole and/or outsole) may be affixed to a lasted upper (e.g., the foot-surrounding material of a shoe as maintained on a tooling known as a cobbler's last) by an adhesive applied to one of the bottom of the lasted upper and/or the non-ground facing surface of the sole. An intersection is formed at a transition from the upper to the sole when joined, which is referred to as a biteline. Adhesive that extends above the biteline may be visible on the upper as it is not obscured by the sole. If adhesive does not extend all of the way to the biteline and instead falls below the biteline, the sole could separate from the upper at the biteline causing a failure. As a result, when manufacturing an article of footwear, the application of the adhesive up to, but not extending beyond, the biteline allows for an acceptable article. When automating the application of a material by a nozzle, control of the application of the material is related to the example provided above about adhesive to the biteline. A level of consistency (e.g., precision and anticipated deposition of material) at the edge of material application is beneficial to minimize creation of unacceptable articles by ensuring appropriate coverage of the material at intended locations.

The first nozzle 104 outputs material in a first application pattern 402 that has a coverage area represented by area 410. For discussion purposes, the cross-sectional shape of the application patterns is circular in nature, but it could be any shape, as previously discussed. Therefore, a coverage area provided by the first application pattern 402 when the cross-sectional shape is circular is the formula for determining circular area (i.e., area=$0.2570^2$, where "D" is the distance represented by numeral 410 in this example). Therefore, the coverage area of the first application pattern 402 is less than the coverage of a second application pattern 404 from the second nozzle 106 that has a surface contact length represented by a numeral 412 at the article surface 416.

The first nozzle 104 may output material, such as adhesive, within a range of 0.05 gram per second (i.e., 0.05 g/sec) to 0.3 g/sec while achieving a spray width of 2 millimeters (mm) to 15 mm and a depth (e.g., thickness) of material application in the about 10 to 60 micrometer range (plus or minus 10%), in an exemplary aspect. The second nozzle 106 may output material, such as adhesive, within a range of 0.1 g/sec to 0.5 g/sec while achieving a spray width of 5 mm to 25 mm and a depth (e.g., thickness) of material application in the 10 to 60 micrometer range, in an exemplary aspect. It is contemplated that a flow rate, spray width (e.g., diameter), and/or application depth may be independently changed from those values provided to achieve aspects hereof.

There is an overlap area 414 of material from the first application pattern 402 and from the second application pattern 404. Having the overlap area 414 compensates for lack of consistency at an application edge caused by the second application pattern 404. If insufficient or inconsistent material is applied at an area (e.g., edge of an application pattern), the resulting article may not meet quality standards. Therefore, in an exemplary aspect, the second application pattern 404 overlaps with the first application pattern 402 to ensure sufficient application of material at an area proximate the boundary of the second application pattern 404. A cross-sectional perspective of the material application highlights a distinction between the consistent application edge of the first nozzle 104 and the greater surface coverage with less consistent edge application of the second nozzle 106, as seen in exemplary FIG. 5 hereinafter.

Figure 5:
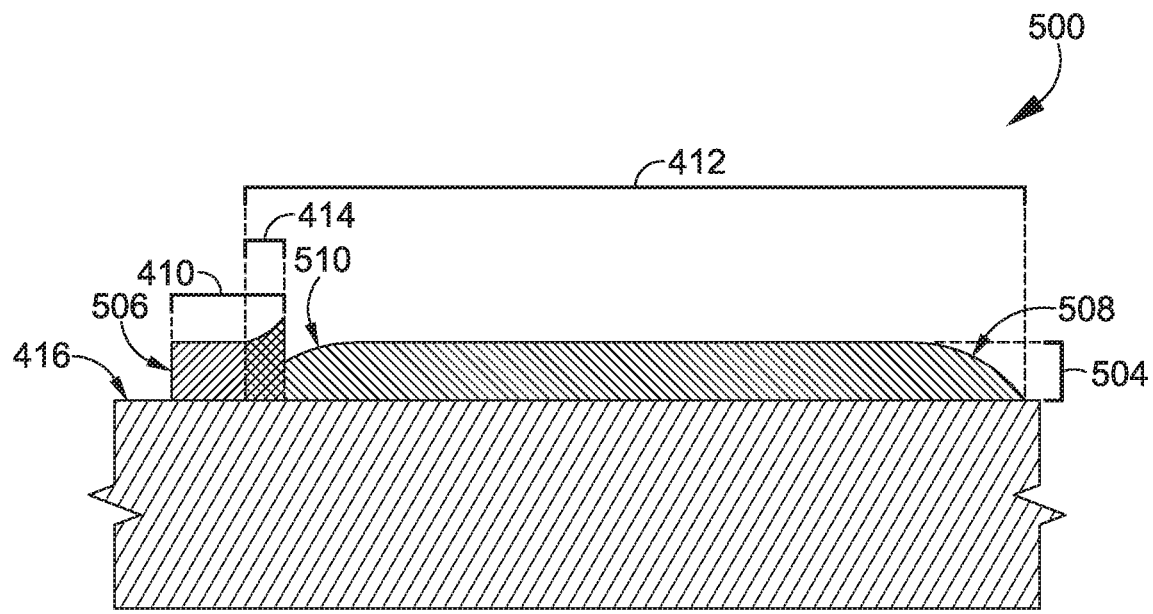
FIG. 5 depicts an exemplary cross-section view of material applied to the article surface by the first nozzle and the second nozzle of FIG. 4, in accordance with aspects hereof.

FIG. 5 depicts an exemplary cross-section view 500 of material applied to the article surface 416 by the first nozzle 104 and the second nozzle 106 of FIG. 4, in accordance with aspects hereof. A first material is applied by the first nozzle 104 in the area defined by the numeral 410 and a second material is applied by the second nozzle 106 in the area defined by the numeral 412. The first application pattern forms an application edge 506 that is relatively consistent and precise. The second application pattern forms application edges 508, 510 that are more graduated and therefore less consistent from a material volume application perspective. For example, the application edge 508 is depicted as tapering in material application thickness. The closer to the edge of material application, the less material that is deposited. This gradient of application can result in an insufficient amount of material application for quality control purposes. As a result, at the application edge 510 of the second application pattern, the first application overlaps coverage to ensure a sufficient amount of material is deposited in an area demarcated by the numeral 414.

The overlap area therefore is formed from material applied by the first nozzle 104 and material applied by the second nozzle 106 from FIG. 4, in an exemplary aspect. This overlap compensates for the lack of consistent material application at the application edge 510 of the second application pattern. In exemplary aspects, the second application pattern deposits material over a greater area than the first application pattern during a comparable movement and application time. A result of the greater coverage area of the second application pattern may, in an exemplary aspect depicted in FIG. 5, be a reduction in application edge consistency that is therefore compensated for with an overlapping area with another application pattern or subsequent overlap with the same application pattern as will be discussed in FIG. 7 hereinafter.

A depth 504 is achieved in the area 412. A depth similar to depth 504 is also achieved in the area 410, in an exemplary aspect. It is understood that the depth of the area 412 and 410 may be similar or different in aspects hereof. Similarly, it is contemplated that the depth 504 may be within a range of 10 to 60 micrometers to achieve acceptable quality metrics in footwear construction; however, it is contemplated as being greater or lesser in thickness in alternative aspects. Further, in an overlap area, such as area 414, it is contemplated that the combination of materials from the first nozzle and from the second nozzle also results in a material thickness within the range of 10 to 60 micrometers. This exemplary range of adhesive thickness allows for traditionally used materials in the footwear manufacturing industry to achieve a sufficient bond for quality control purposes.

Figure 6:
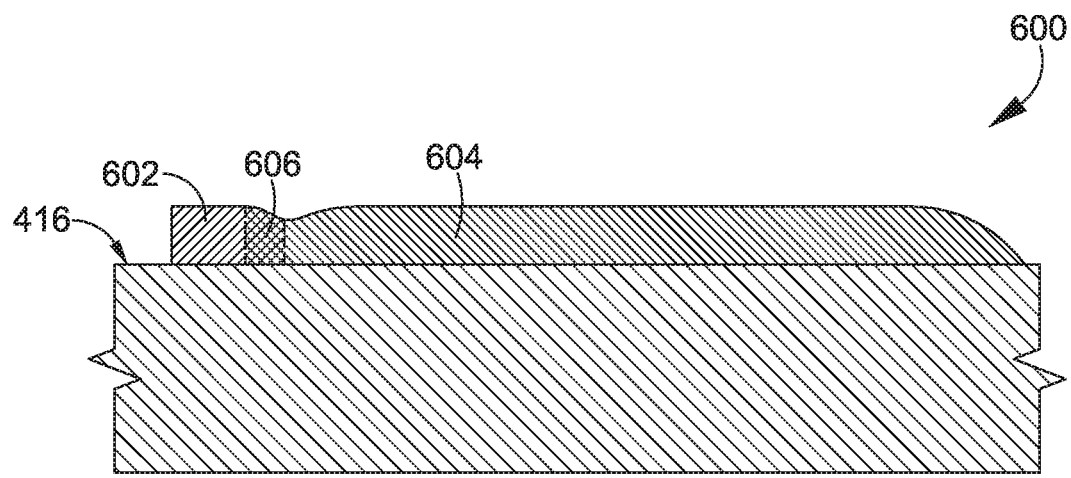
FIG. 6 depicts an exemplary cross-section view of material applied to the article surface by the first nozzle and the second nozzle of FIG. 4, in accordance with aspects hereof.

FIG. 6 depicts an exemplary cross-section view 600 of material applied to the article surface 416 by the first nozzle 104 and the second nozzle 106 of FIG. 4, in accordance with aspects hereof. As distinguished from FIG. 5, characteristics of the material smooth out and normalize transitions between application patterns. For example, the material 602 deposited by the first nozzle 104 and the material 604 deposited by the second nozzle 106 of FIG. 4 overlap and form a converged portion 606. The height transition from material 602 to material 604 is not as pronounced as in the depiction of FIG. 5 as a result of material interactions, such as surface tension and material attraction as the materials interact at the converged portion 606. In this example, the converged portion 606 and the boundary portion of material 604 may have a smaller quantity in some portions than other portions, but the amount of material overlap to form the converged portion 606 is sufficient, in an exemplary aspect, to achieve quality standards.

Figure 7:
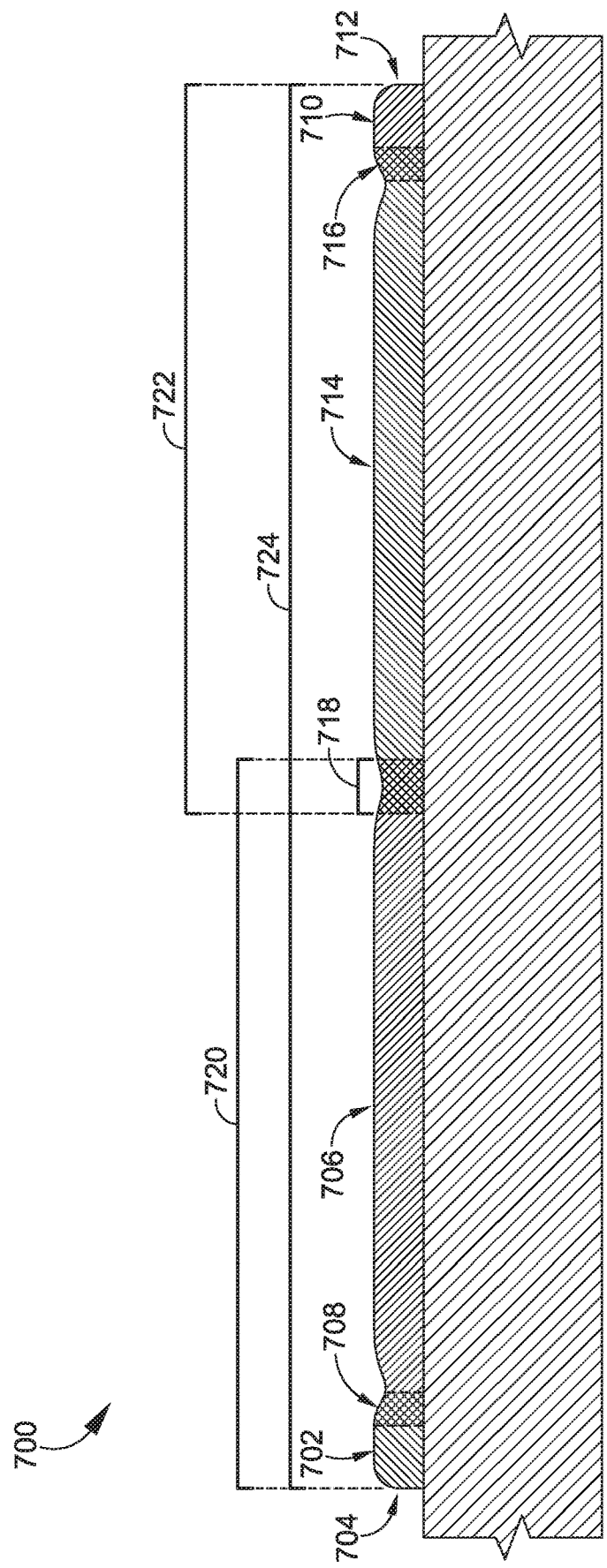
FIG. 7 depicts a multipass material coverage from a multiple-nozzle tool, in accordance with aspects hereof.

FIG. 7 depicts a multipass material coverage 700 from a multiple-nozzle tool, in accordance with aspects hereof. The material 724 is applied in two passes: a first pass 720 and a second pass 722. As can be seen, the multiple-nozzle tool applies material such that a first nozzle applies a first material 702, 710 to a perimeter boundary forming boundary edges 704 and 712, respectively. The boundary edges provide a sufficient degree of consistency of material application at exterior perimeters. As previously discussed, the first nozzle 104 of FIG. 4 may be implemented to apply the material 702 and 710.

A second material 706 in the first pass 720 and a second material 714 in the second pass 722 provide a greater coverage area of material than the first material 702, 710 applications. The second nozzle 106 from FIG. 4 may be effective for applying the second material 706, 714. The first pass 720 and the second pass 722 cause an overlap 718 of second material 706, 714. The overlap 718 of second material, in an exemplary aspect, compensates for a more inconsistent boundary edge than provided by the first nozzle 104, in an exemplary aspect. As the second material is applied to an internal area defined by an exterior perimeter of the boundary edges 704, 712, the lower consistency in application amount relative to the first material does not have as much of an impact on quality standards, in an exemplary aspect. For example, as the second material may be applied to a central area of a sole as opposed to proximate where a biteline is defined, there is less opportunity for tearing or peeling to cause a separation of parts if the material is an adhesive at the central area as opposed to the biteline/intersection of disparate components.

Further, in the first pass 720 and the second pass 722, an overlap between the first material 702, 710 and the second material 706, 714, respectively, create overlap material 708, 716, also respectively. These overlaps compensate for variability in boundary edges that may occur with the application of the second material by a nozzle adapted to apply over a greater area with less consistency than a nozzle that applies a more precise, limited material, such as the first nozzle. Stated differently, by creating an overlap portion of the second application patterns, which provides a greater coverage but less precision than the first application pattern, the overlapping portions of the second application patterns compensate for variability in the boundary edges of the second application pattern to ensure sufficient material is applied.

Figure 8:
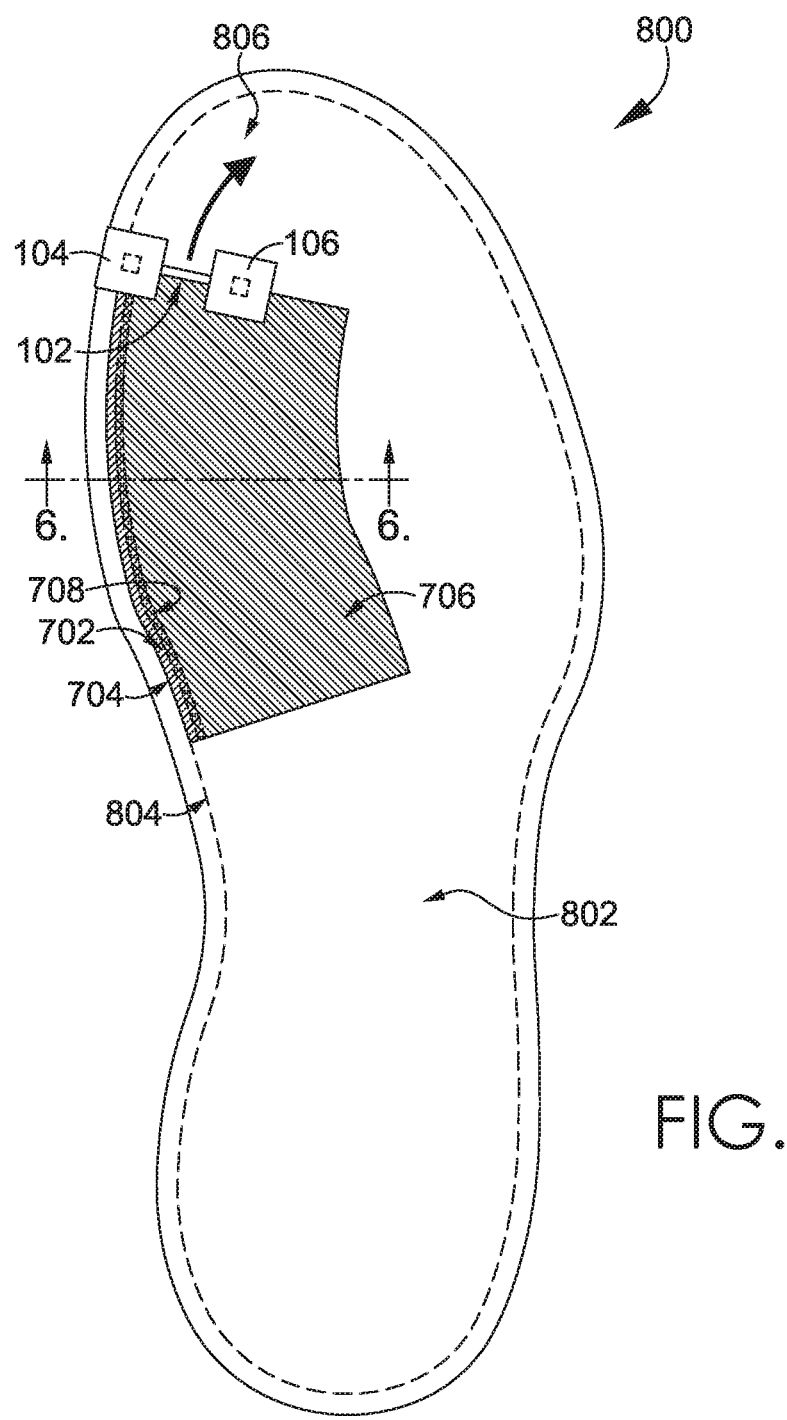
FIG. 8 depicts an application of adhesive to a footwear component by the multiple-nozzle tool of FIG. 1, in accordance with aspects hereof.

FIG. 8 depicts an application 800 of adhesive to a footwear component 802 (e.g., sole) by the multiple-nozzle tool 102, in accordance with aspects hereof. Similarly numbered elements of FIG. 8 are captured in the previously discussed FIGS. 1-7. For example, the tool 102 as previously described includes the first nozzle 104 having the first application pattern and the second nozzle 106 having the second application pattern, wherein the second application pattern provides a greater coverage area than the first application pattern. Additionally, the first application pattern provides a more controlled, precise, and consistently applied material at the boundary edges that ensures sufficient and appropriate material application at an application boundary/edge for quality control, in an exemplary aspect.

The footwear component 802 is depicted as a sole, but it can be any component in an article of footwear, such as a lasted upper. The footwear component 802 is depicted as having a perimeter 804 at which an applied material is intended to be applied, but not to extend past. For example, the perimeter 804 may be a bonding edge, such as a biteline where a sole and an upper intersect. If the material extends beyond the perimeter 804, the material may extend into a visible portion of the footwear that detracts from an intended visual appearance. Similarly, if the material fails to extend to the perimeter 804, the sole and a bonded upper may be prone to separation at the intersection. As such, a consistent and precise application of material up to the perimeter 804 is attempted by use of the multiple-nozzle tool 102 and the first nozzle 104.

The material application depicted in FIG. 8 is the first pass 720 from FIG. 7 prior to the application of the second pass 722. As such, the first material 702 is applied such that the boundary edge 704 corresponds with the perimeter 804. Because of the consistent application of material, such as an adhesive, by the first nozzle 104, a high tolerance of material application having the boundary edge 704 aligned with the perimeter 804 is possible. The second material 706 covers a greater surface area of the footwear component 802 than the first material 702. As the second material 706 is more interior from the perimeter 804 than the first material 702, less precision in exchange for the greater coverage area is allowed in an exemplary aspect, as the material can still be maintained at the perimeter 804 by the first nozzle 104 while achieving application coverage in the interior of the perimeter 804 by the second nozzle 106. An interior area is, in an exemplary aspect, an area that does not include a perimeter edge intended to have a high consistency application of material. With respect to footwear, an interior area may be the bottom surface of a lasted upper up to an area covered by a more precisely applied material.

The area within the perimeter 804 has material applied by the multiple-nozzle tool 102. The multiple-nozzle tool 102 may follow a robot tool path that controls the location of material application to ensure application up to the perimeter 804 and providing sufficient overlap between material portions and passes. The tool path is depicted by an arrow 806 as the multiple-nozzle tool 102 extends from a medial side of the footwear component 802 towards a toe end before eventually heading in a heel-ward direction along the lateral side of the footwear component 802, in this exemplary aspect. This loop-like tool path allows for the second nozzle 106 to remain more proximate the interior and the first nozzle 104 to remain more proximate the perimeter 804 while applying material on the article of footwear component 802, in this exemplary aspect. When completed, the cross-section of FIG. 7 depicts an exemplary material application across an article of footwear component, such as the article of footwear component 802 of FIG. 8.

Figure 9:
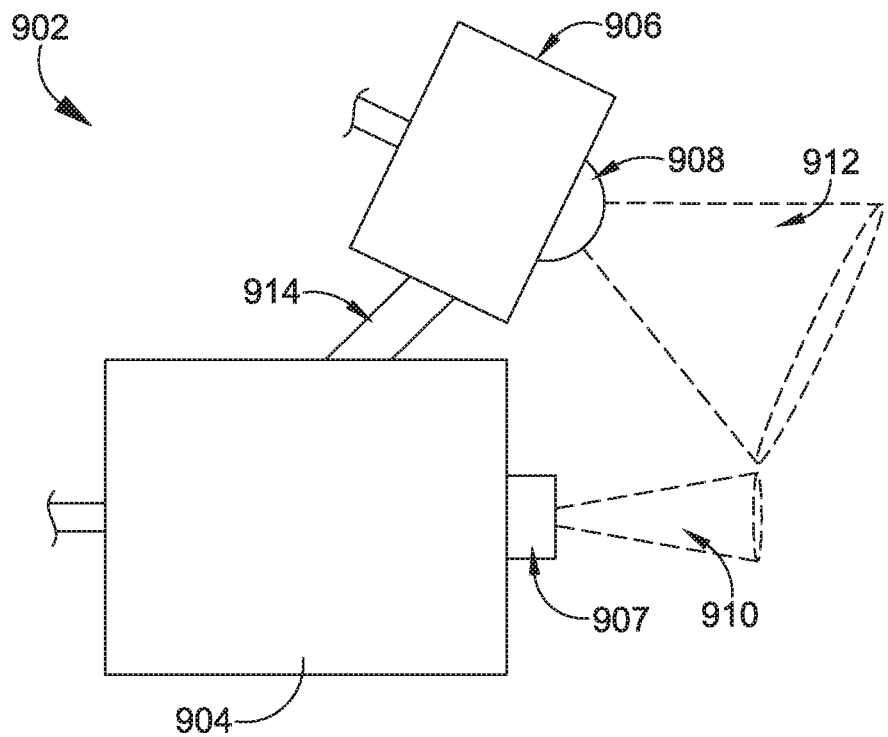
FIG. 9 depicts an alternative multiple-nozzle tool, in accordance with aspects hereof.

FIG. 9 depicts an alternative multiple-nozzle tool 902, in accordance with aspects hereof. A first nozzle 904 is coupled by a coupling element 914 with a second nozzle 906. The first nozzle 904 has an output port 907 providing a first application pattern 910 of a material. The second nozzle 906 has an output port 908 providing a second application pattern 912 of a material. The first application pattern 910 is more controlled, precise, and consistent in material application at boundary edges than the second application pattern 912. Conversely, the second application pattern 912 provides greater surface area coverage than the first application pattern 910. Therefore, as discussed with respect to the multiple-nozzle tool 102 previously, the first nozzle is adapted to apply material, such as adhesive, proximate a perimeter and the second nozzle is adapted to apply material over a larger surface area with less edge boundary precision.

It is contemplated that an angle between the first nozzle 904 and the second nozzle 906 as maintained by the coupling element 914 is configured such that the first application pattern 910 and the second application pattern 912 overlap at a component's (e.g., sole) surface at a known distance therefrom to ensure sufficient material application. However, in an alternative aspect, pressure, nozzle angle, volume, approach angle, and the like may all be varied dynamically during the application of the material by one or more instructions from a computing device. Therefore, a static configuration is not limiting.

Figure 10:
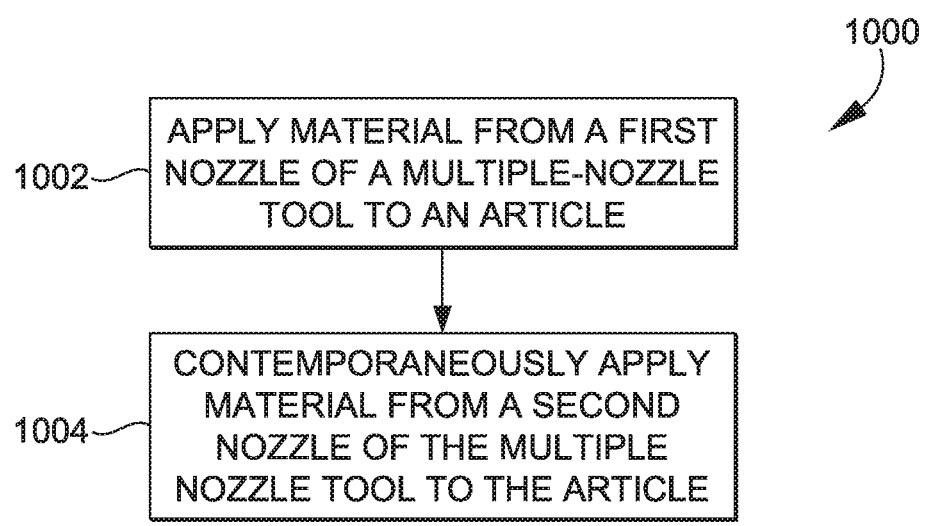
FIG. 10 depicts a flow diagram representing a method of applying material with a multiple-nozzle tool, in accordance with aspects hereof.

FIG. 10 depicts a flow diagram representing a method 1000 of applying material with a multiple-nozzle tool, in accordance with aspects hereof. At a block 1002, material is applied to an article from a multiple-nozzle tool, such as the multiple-nozzle tool 102 of FIG. 1 or from the multiple-nozzle tool 902 of FIG. 9. The material may be any material, such as a colorant, adhesive, primer, or surface treatment. Further, the material may be liquid, gel, particulate, or the like. For example, some materials may be powder based, some may be liquid based, and some may be viscous solutions. The application of the material may be controlled by a computing device in connection with one or more components, such as a movement mechanism (e.g., robot), a vision system, material pressurization/pump components, and the like.

At a block 1004, the method continues contemporaneously applying the material from a second nozzle of the multiple-nozzle tool to the article. The first nozzle applies the material at an application perimeter edge and the second nozzle applies the material more interior on the article from the application perimeter edge. Contemporaneous application of the material contemplated both the first and second nozzles applying the material at a common time to prevent, in an exemplary aspect, a multiple-pass operation of discrete tools. Instead, a common tool movement can position both the first nozzle and the second nozzle appropriately for application of material. This may reduce cycle time for applying the material as the number of independent movements may be reduced, in an exemplary aspect. As used herein, an interior portion of an article is a location on the article that is distal from a perimeter at which consistency (e.g., consistent volume of material, precise application of material) is intended.

As the first nozzle is intended to apply, in this example, material at an edge boundary proximate an application perimeter, the first nozzle applies a smaller volume of material over a smaller area than the second nozzle. Stated differently, the second nozzle applies a greater volume of material in a given time than the first nozzle that is contemporaneously applying material, in an exemplary aspect.

As previously discussed with respect to FIG. 7, it is contemplated that the method may also include moving the multiple-nozzle tool while applying the material such that the material applied from the second nozzle at a first time overlaps with the material applied by the second nozzle at a second time. This creates the overlap 718 of FIG. 7. Additionally, this allows for the first nozzle to continue to apply material along a perimeter and the second nozzle to apply material at an interior portion while still providing the material across the whole intended article, in an exemplary aspect.

While the aspects illustrated focus on two nozzles, it is contemplated that any number of multiple nozzles may be implemented. For example, a three, four, or five-nozzle system may be used. Each of the nozzles may have different application patterns depending on the article and intended application. Therefore, it is contemplated that a consistent application pattern may be used within an interior of the article and a large surface area application pattern may be used proximate a perimeter, in an exemplary aspect.

Figure 11:
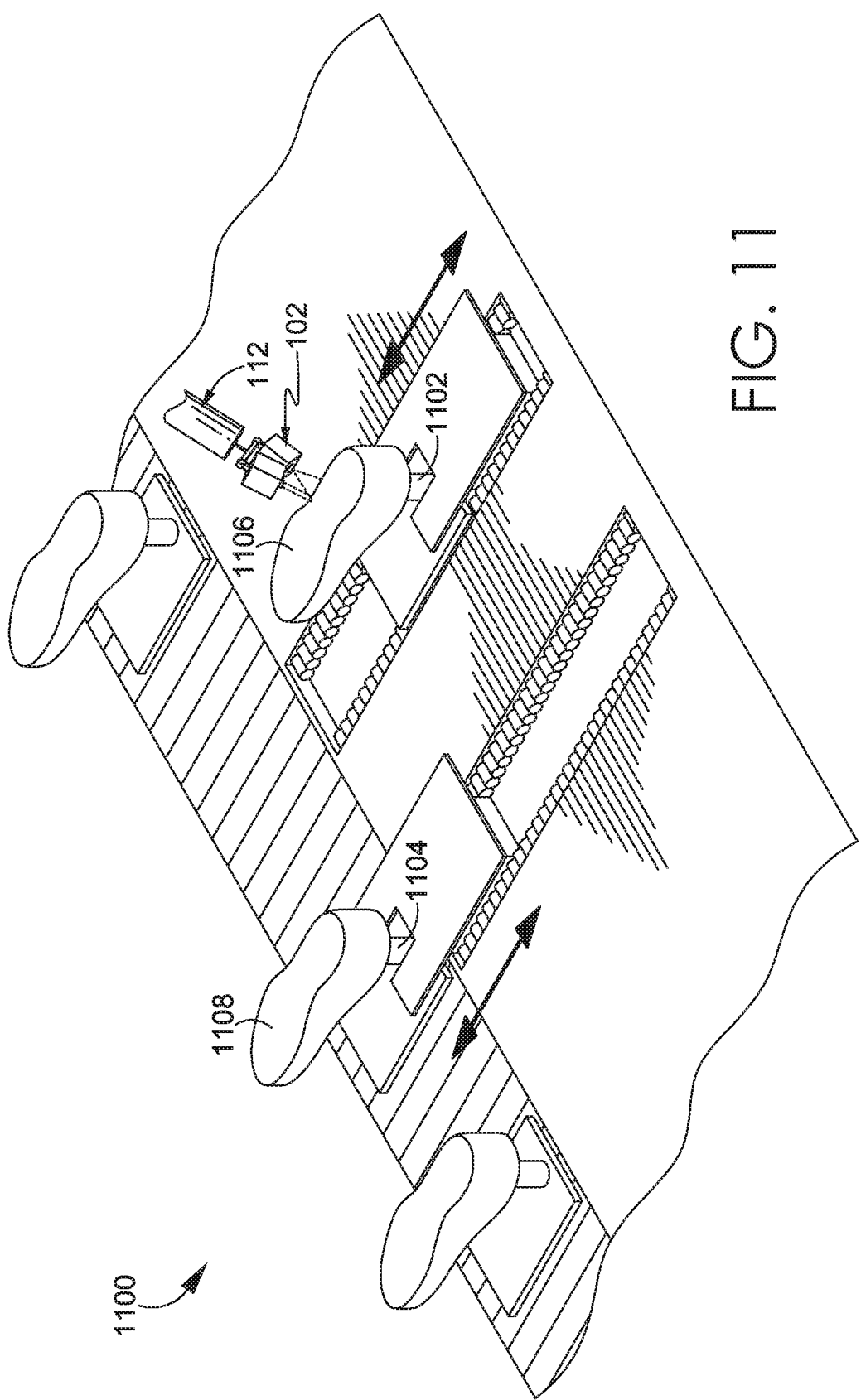
FIGS. 11-12 depict a system using a multiple-nozzle tool with reduced tool downtime, in accordance with aspects hereof.
Figure 12:
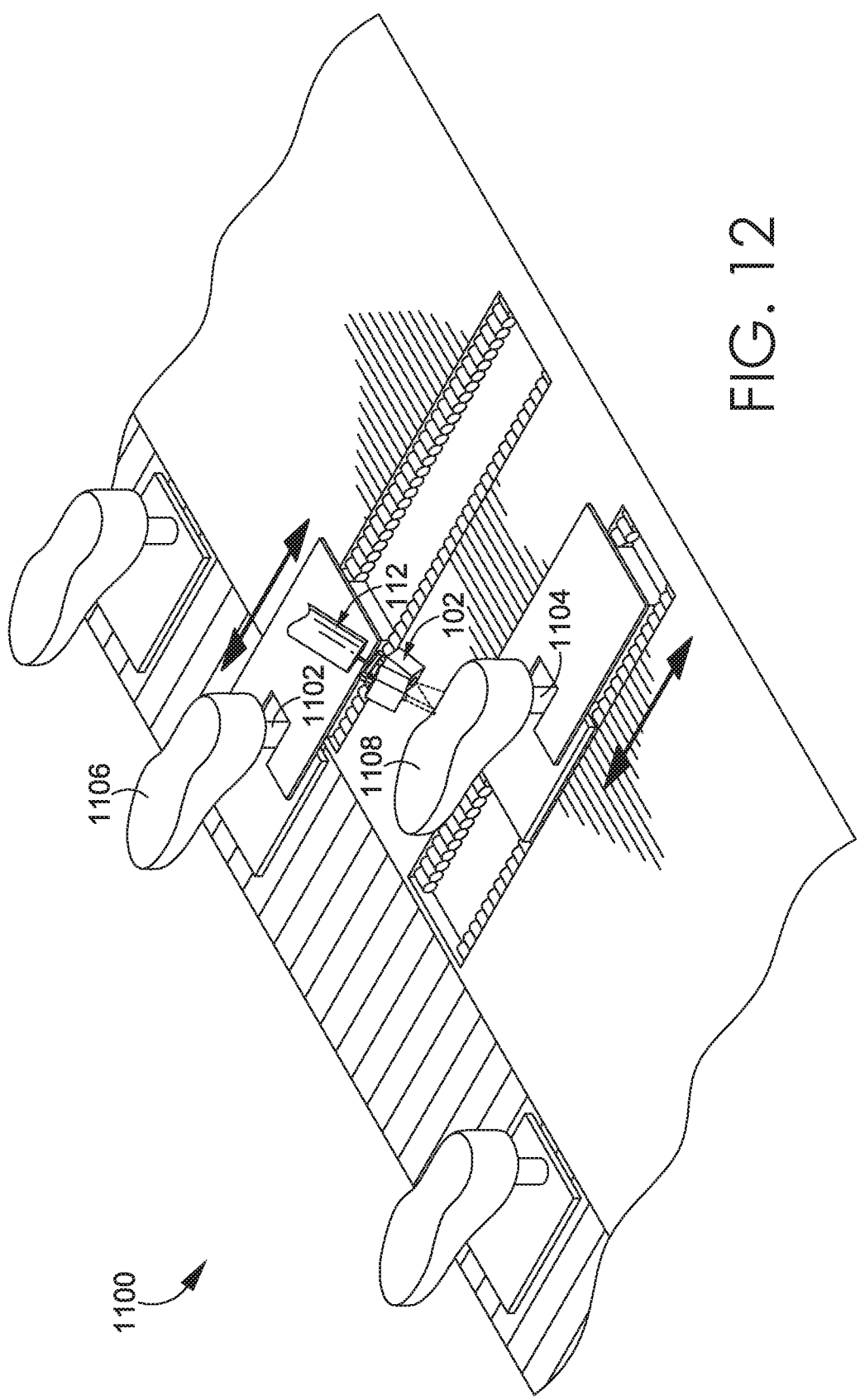

FIGS. 11 and 12 depict a multiple-nozzle tool system 1100, in accordance with aspects hereof. The multiple-nozzle tool 102 is depicted as being moveable by the movement mechanism 112, in this depiction. Efficiencies of the system may be achieved through the independently moveable conveyance mechanisms 1102, 1104 capable of retrieving, positioning, and delivering one or more parts relative to the multiple-nozzle tool 102. For example, the retrieval and delivery portions of a manufacturing cycle may not utilize the multiple-nozzle tool 102, causing that tool to remain idle during those portions. As such, a first part 1106 in FIG. 11 is positioned by the conveyance mechanism 1102 for the multiple-nozzle tool 102 to apply material (e.g., adhesive) thereto while a second part 1108 is depicted as being retrieved by the conveyance mechanism 1104. As then depicted in FIG. 12, the first part 1106 is delivered following the application of material by the multiple-nozzle tool 102 and the second part 1108 has been retrieved and is receiving material from the multiple-nozzle tool 102. This reciprocating action reduces cycle time and increases the return on investment for the multiple-nozzle tool 102 as it is applying material a greater portion of time rather than sitting idle as parts are retrieved and/or delivered.

It is contemplated based on the system 1100 of FIGS. 11 and 12 that a method of manufacturing may be implemented. A first step may include retrieving a first part with a first conveyance mechanism. The first part is positioned by the first conveyance mechanism in a location suitable for a multiple-nozzle tool to apply material at defined locations with appropriate spray characteristics. Once located, the multiple-nozzle tool applies a material, such as an adhesive, to the first part at specified locations with at least a first and a second nozzle working in cooperation to efficiently and precisely apply the material along a defined boundary and interior portion. Following the application of material to the first part, the first part is delivered from the multiple-nozzle tool by the first conveyance mechanism.

A second conveyance mechanism retrieves a second part prior to the second part being delivered by the first conveyance mechanism. For example, while the first part is having material applied thereon by the multiple-nozzle tool, the second conveyance mechanism may retrieve the second part. Following the application of material to the first part, the multiple-nozzle tool may then reposition to apply material to the second part. During the application of material to the second part, the first part may be delivered by the first conveyance mechanism, in an exemplary aspect.

While one or more multiple-nozzle tools are depicted in connection with FIGS. 11 and 12, it is contemplated that the arrangement and configurations provided may be implemented with any tool or process. For example, it is contemplated that a sewing machine, a printer, a painter, a cutting machine, an assembly apparatus, and the like may be implemented in connection with the depicted conveyance mechanism arrangements to achieve manufacturing efficiencies, in exemplary aspects. For example, instead of a multiple-nozzle tool performing an operation as described in connection with FIGS. 11 and 12, it is contemplated that a material coating tool (e.g., a paint sprayer, an ink sprayer, a durable water repellant applicator, or the like) may apply one or more materials to portions of article of footwear in a manner similarly depicted in FIGS. 11 and 12. Additionally it is contemplated that alternative tool paths may be implemented in connection with FIGS. 11 and 12. For example, depending on an operation to be performed, a different tool path used by the tool performing the operation may be implemented to achieve the operation.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein are contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

The invention claimed is:

1. A method of applying material with a multiple-nozzle tool, the method comprising:
   applying the material from a first nozzle of the multiple-nozzle tool to an article, wherein the material is an adhesive, and wherein the article is a component in an article of footwear; and
   contemporaneously applying the material from a second nozzle of the multiple-nozzle tool to the article, wherein the first nozzle applies the material at an application perimeter edge and the second nozzle applies the material more interior on the article from the application perimeter edge,
   wherein the applying the material from the first nozzle applies less volume of the material than the second nozzle during a same time as applying the material from the second nozzle, and
   wherein the multiple-nozzle tool is moving during the applying the material from the first nozzle and the contemporaneously applying the material from the second nozzle.

2. The method of claim 1 further comprising capturing the article with a vision system, wherein the vision system is logically coupled with a computing device and the computing device is logically coupled with a movement mechanism effective to move the multiple-nozzle tool.

3. The method of claim 1 further comprising:
   overlapping the material applied from the first nozzle with the material applied from the second nozzle; and
   moving the multiple-nozzle tool while applying the material such that the material applied from the second nozzle at a first time overlaps with the material applied by the second nozzle at a second time.

4. The method of claim 1, wherein the first nozzle travels a greater distance than the second nozzle while applying the material to the article.

* * * * *

UNITED STATES PATENT AND TRADEMARK OFFICE
CERTIFICATE OF CORRECTION

PATENT NO. : 11,325,146 B2
APPLICATION NO. : 16/983510
DATED : May 10, 2022
INVENTOR(S) : Che-Sheng Chen and Chien-Liang Yeh It is certified that error appears in the above-identified patent and that said Letters Patent is hereby corrected as shown below:

In the Specification

Column 1, Line 9: Delete "62,427,695," and insert -- 62/427,695, --.
Column 6, Line 20: Delete "area=$0.2570^2$," and insert -- area=$0.25\pi D^2$, --.

Signed and Sealed this
Second Day of August, 2022

Katherine Kelly Vidal
*Director of the United States Patent and Trademark Office*